United States Patent
Thompson

(10) Patent No.: US 10,946,782 B2
(45) Date of Patent: *Mar. 16, 2021

(54) ASSISTANCE VEHICLE TILT LIFT

(71) Applicant: Charlie Homer Thompson, Santa Teresa, NM (US)

(72) Inventor: Charlie Homer Thompson, Santa Teresa, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 16/996,772

(22) Filed: Aug. 18, 2020

(65) Prior Publication Data

US 2021/0016700 A1    Jan. 21, 2021

Related U.S. Application Data

(63) Continuation of application No. 16/515,818, filed on Jul. 18, 2019, now Pat. No. 10,773,630.

(51) Int. Cl.

| | | |
|---|---|---|
| *B60P 3/06* | (2006.01) | |
| *B60R 9/042* | (2006.01) | |
| *B60P 1/43* | (2006.01) | |
| *B60P 1/64* | (2006.01) | |
| *B62D 33/023* | (2006.01) | |
| *B60P 3/08* | (2006.01) | |
| *B60P 1/52* | (2006.01) | |
| *B62D 33/027* | (2006.01) | |

(52) U.S. Cl.
CPC ............... *B60P 3/06* (2013.01); *B60P 1/435* (2013.01); *B60P 1/52* (2013.01); *B60P 1/649* (2013.01); *B60P 1/6409* (2013.01); *B60P 3/08* (2013.01); *B60R 9/042* (2013.01); *B62D 33/023* (2013.01); *B62D 33/027* (2013.01)

(58) Field of Classification Search
CPC .. B60P 3/06; B60P 1/52; B60P 1/6409; B60P 1/435; B60P 3/08; B62D 33/023; B62D 33/027; B60R 9/042
USPC .............. 410/3, 4, 6, 24, 26, 29, 29.1; 296/3
See application file for complete search history.

(56) References Cited

U.S. PATENT DOCUMENTS

| | | | | |
|---|---|---|---|---|
| 7,455,489 B1* | 11/2008 | Klev | ......................... | B60P 3/07 410/3 |
| 10,773,630 B1* | 9/2020 | Thompson | ........... | B62D 33/027 |
| 2008/0292438 A1* | 11/2008 | Patterson | .................. | B60P 3/07 414/537 |

* cited by examiner

*Primary Examiner* — Stephen T Gordon

(74) *Attorney, Agent, or Firm* — Holzer Patel Drennan

(57) ABSTRACT

An assistance vehicle tilt lift supports an assistance vehicle above a bed of a hauling vehicle and includes one or more pivoting racks. Each pivoting rack includes a track to receive one or more wheels of the assistance vehicle. Each pivoting rack is rotatably attached to a pivot point near the front end of the bed of the hauling vehicle. One or more tapered rails are attached to the bed of the hauling vehicle. One or more roller support members are in contact with the one or more tapered rails and rotatably attached to the one or more pivoting racks. An actuator is operably connected to the one or more roller support members. The actuator raises and lowers the rear end of the one or more pivoting racks relative to the pivot point by moving the one or more roller support members along the one or more tapered rails.

20 Claims, 11 Drawing Sheets

1100

Engage actuator to move roller support members of an assistance vehicle tilt lift on a bed of a hauling vehicle
1104

Lower the rear end of pivoting racks of the assistance vehicle tilt lift
1102

Unload the assistance vehicle from the tracks of the pivoting racks of the assistance vehicle tilt lift
1106

FIG. 11

ASSISTANCE VEHICLE TILT LIFT

CROSS-REFERENCE TO RELATED APPLICATIONS

The present application is continuation of U.S. patent application Ser. No. 16/515,818, entitled "Assistance Vehicle Tilt Lift" and filed on Jul. 18, 2019, which is specifically incorporated by reference herein for all that it discloses and teaches.

BACKGROUND

Many individuals have special transportation needs resulting from injuries, illnesses, and other conditions. For example, such individuals may be non-ambulatory and therefore make use of powered assistance vehicles to achieve significant levels of mobility. While full-size, street-legal vehicles, such as cars and trucks, provide acceptable transportation in many scenarios, they are typically limited to larger traffic areas, including roads, parking lots, driveways, dirt/gravel roads, etc. When such individuals need to go "off-road," such as on walking paths, lawns, camping sites, golf courses, cemeteries, etc., such larger vehicles may be prohibited or inappropriate. In such scenarios, powered assistance vehicles, such as golf carts, provide better options. Yet, transporting the powered assistance vehicles via the larger traffic areas to the "off-road" locales can present a new set of special transportation needs.

SUMMARY

The described technology provides an assistance vehicle tilt lift configured to support an assistance vehicle above a bed of a hauling vehicle. The bed has a front end and a rear end. The assistance vehicle includes one or more wheels. The assistance vehicle tilt lift includes one or more pivoting racks. Each pivoting rack includes a track configured to receive at least one of the one or more wheels of the assistance vehicle and further includes a front end positionable near the front of the bed and a rear end positionable near the rear of the bed. Each pivoting rack is rotatably attached to a pivot point near the front end of the bed of the hauling vehicle. One or more tapered rails are configured to be attached to the bed of the hauling vehicle. One or more roller support members are configured to be in contact with the one or more tapered rails and rotatably attached to the one or more pivoting racks. An actuator is operably connected to the one or more roller support members. The actuator is configured to raise and lower the rear end of the one or more pivoting racks relative to the pivot point by moving the one or more roller support members along the one or more tapered rails.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 11 illustrates operations for unloading a vehicle from an example assistance vehicle tilt lift.

DETAILED DESCRIPTIONS

An example assistance vehicle tilt lift includes a pivoting rack powered by an electric actuator. An assistance vehicle, such as a golf cart, can be driven from the ground or other base surface, up one or more ramps (e.g., all-terrain-vehicle ramps) at the rear of a hauling vehicle, and onto the assistance vehicle tilt lift on the bed of a hauling vehicle, such as a pick-up truck. A pivot point for the assistance vehicle tilt lift is anchored to a point near the front of the bed. The rear of the assistance vehicle tilt lift can be raised, relative to the bed of the hauling vehicle, by a lift mechanism powered by an electric actuator. In one implementation, the lift mechanism includes roller support members that move along an axis of the bed and lift the pivoting rack near the rear of the hauling vehicle, although other moving and lifting mechanisms may be employed (e.g., sliding interfaces, joints). The lift mechanism can lift the assistance vehicle to a distance near the rear of that hauling vehicle that will allow the tailgate to be closed.

Figure 1:
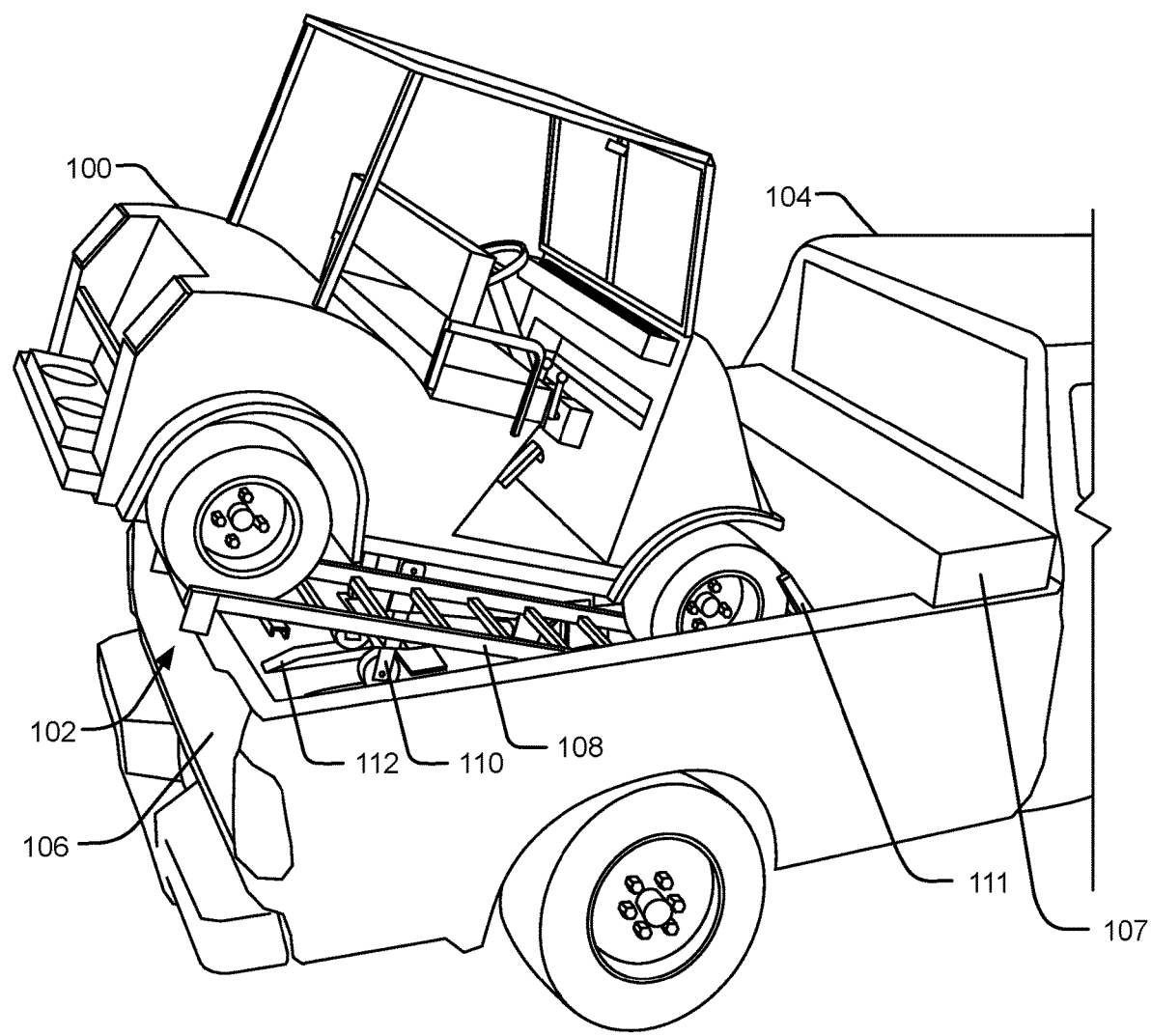
FIG. 1 illustrates a golf cart tilted on an example assistance vehicle tilt lift in a bed of a pickup truck.

FIG. 1 illustrates a golf cart 100 tilted on an example assistance vehicle tilt lift 102 in a bed of a pickup truck 104. The combination of the golf cart 100 and the pickup truck 104 represent an example assistance system. The assistance vehicle tilt lift 102 is in a raised position. The golf cart 100 is an example "assistance vehicle," although other vehicles may also be tilted and lifted by the assistance vehicle tilt lift 102. The pickup truck 104 is an example "hauling vehicle," although other vehicles may also be used to transport assistance vehicles. In some implementations, the golf cart 100 averages 4'×8' and weighs between 800-900 pounds. Accordingly, by tilting the golf cart 100 within the bed of the pickup truck 104, the golf cart 100 can fit into the bed while providing clearance for closing the tailgate 106.

In one implementation, the pickup truck 104 includes "standard long bed" (8' long) or a "compact long bed" (7' long), with the tailgate 106 closed. When the tailgate 106 is open, the bed extends along the tailgate another 20" toward the back of the pickup truck 104. As such, when open, the tailgate 106 provides an additional surface of the bed. Some pickup trucks will have a cross over toolbox that can take up 12" or more of the bed length. Accordingly, Other configurations may have different dimensions than described here without departing from the system that is claimed in one or more of the claims.

As illustrated, the golf cart 100 is longer than the bed when the tailgate 106 is closed. Accordingly, the assistance vehicle tilt lift 102 tilts the golf cart 100, such that the back end of the golf cart 100 is supported above the tailgate 106 while the front end of the golf cart 100 is tilted down toward a pivot point (not shown) near the front of the bed. It should be understood that the golf cart 100 could also be positioned on the assistance vehicle tilt lift 102 such that the front of the golf cart 100 is tilted up near the rear of the pickup truck 104 while the back end of the golf cart 100 is tilted down toward the pivot point near the front of the bed.

The golf cart 100 may be further secured to the bed, to the pickup truck 104, and/or to the assistance vehicle tilt lift 102, such as by straps, chains, ropes. The assistance vehicle tilt lift 102 is shown in FIG. 1 as including a pivoting rack 108, two roller support members 110, and two tapered rails 112, which will be described in more detail with reference to other figures. The roller support members 110 are rotatably connected to the pivoting rack 108. An electric actuator (not shown) includes a rigid link that retracts from and extends to the roller support members 110.

In one implementation, when the rigid link retracts, the roller support members 110 move toward the front of the bed and rotate relative to the pivoting rack 108, causing the pivoting rack 108 to pivot relative to the pivot point in the bed and lifting the rear of the pivoting rack 108 above the rear of the bed. When the rigid link extends, the roller support members 110 move toward the rear of the bed and rotate relative to the pivoting rack 108, causing the pivoting rack 108 to pivot relative to the pivot point in the bed and lowering the rear of the pivoting rack 108 toward the rear of the bed. In another implementation, direction of the roller support members 110 may be reversed, such that extending the rigid link moves the roller support members 110 toward the rear of the bed and raises the pivoting rack 108 and retracting the rigid link moves the roller support members 110 toward the front of the bed and lowers the pivoting rack 108. In such a reversed implementation, the taper rails would also be reversed to assisted in the lifting motion. In some implementations, the electric actuator can include or be connected to an electric motor, pneumatic equipment, hydraulic equipment, or other systems to extend and retract the rigid link.

A wheel restraint 111 is position near the front of the assistance vehicle tilt lift 102 to prevent the golf cart 100 from rolling down the tilted pivoting rack 108 and into the back of the truck cab (or in the illustrated implementation, into the back of a storage container in the bed 107). The wheel restraint 111 may be integrated with the pivoting rack 108 or configured as a separate structure that is anchored to the assistance vehicle tilt lift 102, the bed 107, or some other structure on the pickup truck 104.

Figure 2:
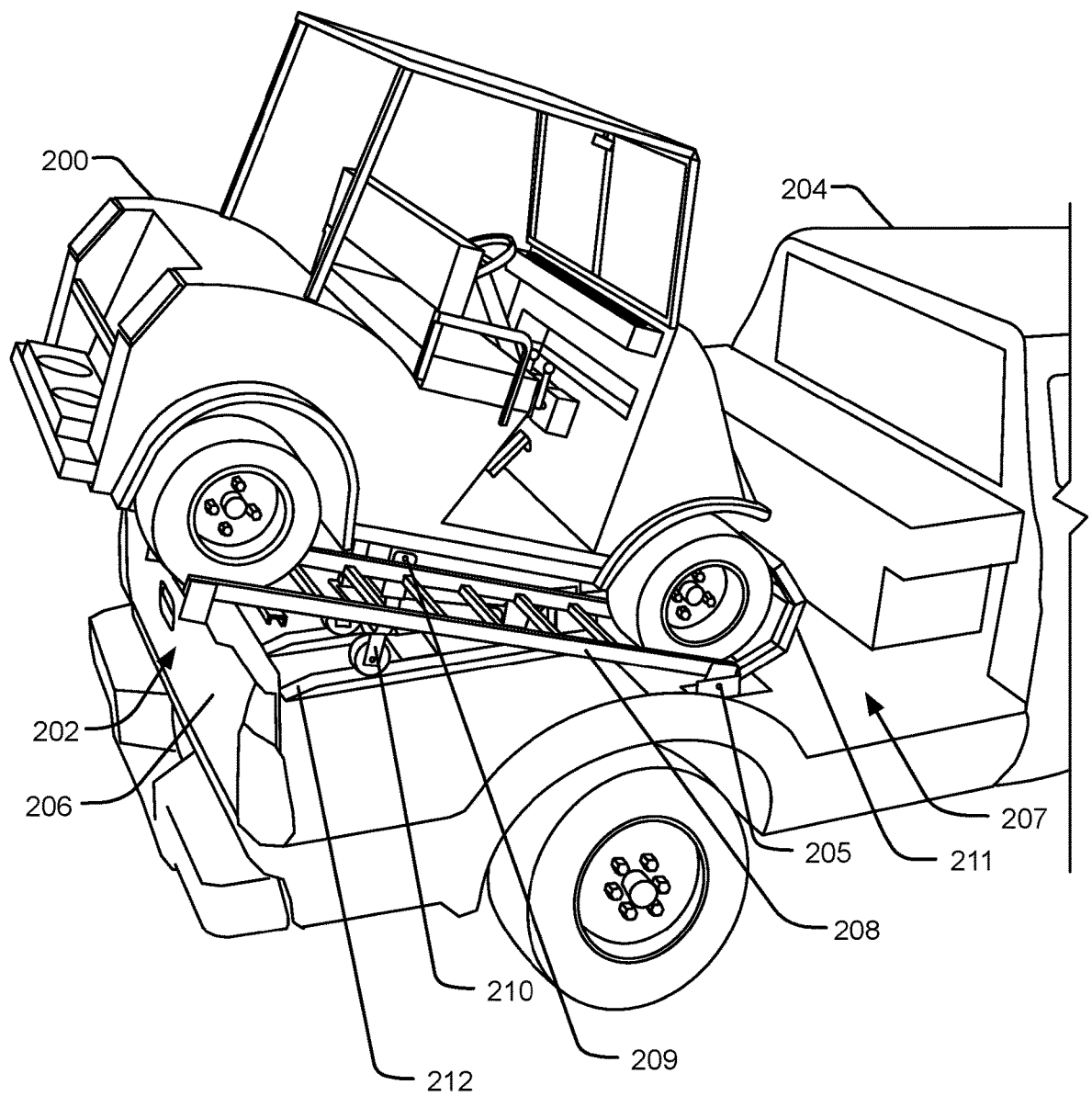
FIG. 2 illustrates a golf cart tilted on an example assistance vehicle tilt lift in a cut-away bed of a pickup truck.

FIG. 2 illustrates a golf cart 200 tilted on an example assistance vehicle tilt lift 202 in a cut-away bed 207 of a pickup truck 204. The assistance vehicle tilt lift 202 is in a raised position. As illustrated, the golf cart 200 is longer than the bed 207 when the tailgate 206 of the pickup truck 204 is closed. Accordingly, the assistance vehicle tilt lift 202 tilts the golf cart 200, such that the back end of the golf cart 200 is supported above the tailgate 206 while the front end of the golf cart 200 is tilted down toward a pivot point 205 near the front of the bed 207. It should be understood that the golf cart 200 could also be positioned on the assistance vehicle tilt lift 202 such that the front of the golf cart 200 is tilted up near the rear of the pickup truck 204 while the back end of the golf cart 200 is tilted down toward the pivot point 205 near the front of the bed 207.

The golf cart 200 may be further secured to the bed 207, to the pickup truck 204, and/or to the assistance vehicle tilt lift 202, such as by straps, chains, ropes. The assistance vehicle tilt lift 202 is shown in FIG. 2 as including a pivoting rack 208, two roller support members 210, and two tapered rails 212, which will be described in more detail with reference to other figures. The roller support members 210 are rotatably connected to the pivoting rack 208 at a rotation point 209. An electric actuator (not shown) includes a rigid link that retracts from and extends to the roller support members 210.

In one implementation, when the rigid link retracts, it pulls the roller support members 210 to move toward the front of the bed 207 and rotate relative to the pivoting rack 208, causing the pivoting rack 208 to pivot relative to the pivot point 205 in the bed 207 and lifting the rear of the pivoting rack 208 above the rear of the bed 207. When the rigid link extends, it pushes the roller support members 210 move toward the rear of the bed 207 and rotate relative to the pivoting rack 208, causing the pivoting rack 208 to pivot relative to the pivot point 205 in the bed 207 and lowering the rear of the pivoting rack 208 toward the rear of the bed 207. In another implementation, direction of the roller support members 210 may be reversed, such that extending the rigid link moves the roller support members 210 toward the rear of the bed 207 and raises the pivoting rack 208 and retracting the rigid link moves the roller support members 210 toward the front of the bed 207 and lowers the pivoting rack 208.

The tapered rails 212 provide a tapered section having a slope to facilitate the rotation of the roller support members 210 during extension and retraction of the rigid link. The tapered rails 212 may also include tracks to further constrain lateral movement of the roller support member 210 within the bed 207.

A wheel restraint 211 is position near the front of the assistance vehicle tilt lift 202 to prevent the golf cart 200 from rolling down the tilted pivoting rack 208 and into the back of the truck cab (or in the illustrated implementation, into the back of a storage container in the bed 207). The wheel restraint 211 may be integrated with the pivoting rack 208 or configured as a separate structure that is anchored to the assistance vehicle tilt lift 202, the bed 207, or some other structure on the pickup truck 204.

Figure 3:
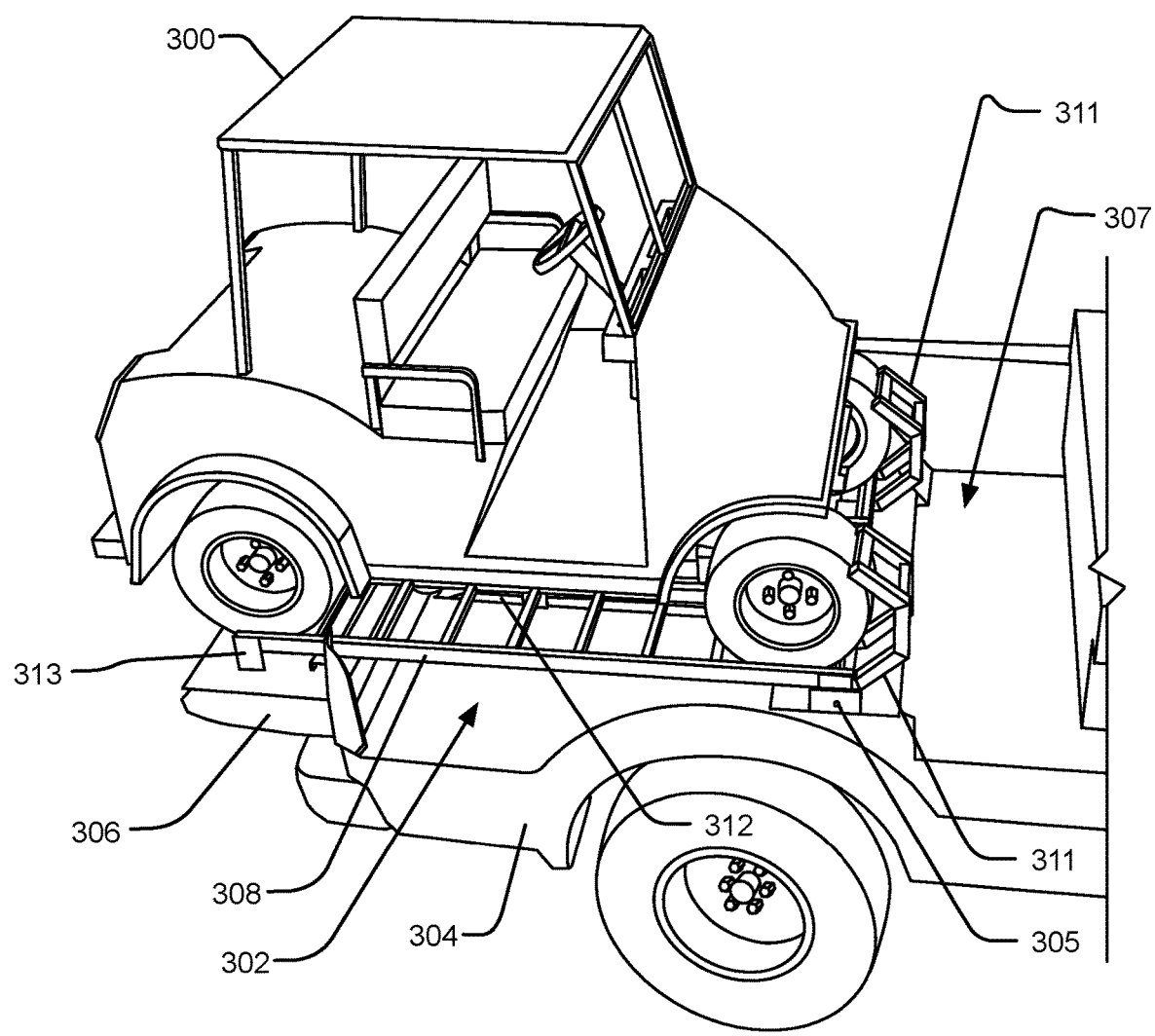
FIG. 3 illustrates a golf cart positioned flat on an example assistance vehicle tilt lift in a cut-away bed of a pickup truck.

FIG. 3 illustrates a golf cart 300 positioned flat on an example assistance vehicle tilt lift 302 in a cut-away bed 307 of a pickup truck 304. The assistance vehicle tilt lift 302 is in a flat or lowered position. As illustrated, the golf cart 300 is longer than the bed 307 when the tailgate 306 of the pickup truck 304 is closed. However, when the tailgate 306 is open, the assistance vehicle tilt lift 302 can tilt the golf cart 300 down to a flat position, extending the back end of the golf cart 300 outside the bed 307 and onto the tailgate 306. A tailgate prop 313 supports the pivoting rack 308 of the assistance vehicle tilt lift 302 in a flat position above the tailgate 306. It should be understood that the golf cart 300 could also be positioned on the assistance vehicle tilt lift 302 such that the front of the golf cart 300 is tilted down near the rear of the pickup truck 304 to extend over the tailgate 306.

The golf cart 300 may be further secured to the bed 307, to the pickup truck 304, and/or to the assistance vehicle tilt lift 302, such as by straps, chains, ropes. The assistance vehicle tilt lift 302 is shown in FIG. 3 as including the pivoting rack 308, two roller support members (not clearly shown), and two tapered rails 312, which will be described in more detail with reference to other figures. The roller support members 310 are rotatably connected to the pivoting rack 308 at a rotation point (not shown). An electric actuator (not shown) includes a rigid link that retracts from and extends to the roller support members.

In one implementation, when the rigid link retracts, it pulls the roller support members 310 to move toward the front of the bed 307 and rotate relative to the pivoting rack 308, causing the pivoting rack 308 to pivot relative to a pivot point 305 in the bed 307 and lifting the rear of the pivoting rack 308 above the rear of the bed 307. When the rigid link extends, it pushes the roller support members move toward the rear of the bed 307 and rotate relative to the pivoting rack 308, causing the pivoting rack 308 to pivot relative to the pivot point 305 in the bed 307 and lowering the rear of the pivoting rack 308 toward the rear of the bed 307. In another implementation, direction of the roller support members may be reversed, such that extending the rigid link moves the roller support members toward the rear of the bed 307 and raises the pivoting rack 308 and retracting the rigid link moves the roller support members toward the front of the bed 307 and lowers the pivoting rack 308. The pivot point 305 is anchored to the bed 307, such as by a bracket.

The tapered rails 312 provide a tapered section having a slope to facilitate the rotation of the roller support members 310 during extension and retraction of the rigid link. The tapered rails 312 may also include tracks to further constrain lateral movement of the roller support member 310 within the bed 307.

Wheel restraints 311 are positioned near the front of the assistance vehicle tilt lift 302 to prevent the golf cart 300 from rolling down the tilted pivoting rack 308 and into the back of the truck cab (or in the illustrated implementation, into the back of a storage container in the bed 307). Each wheel restraint 311 may be integrated with the pivoting rack 308 or configured as a separate structure that is anchored to the assistance vehicle tilt lift 302, the bed 307, or some other structure on the pickup truck 304.

Figure 4:
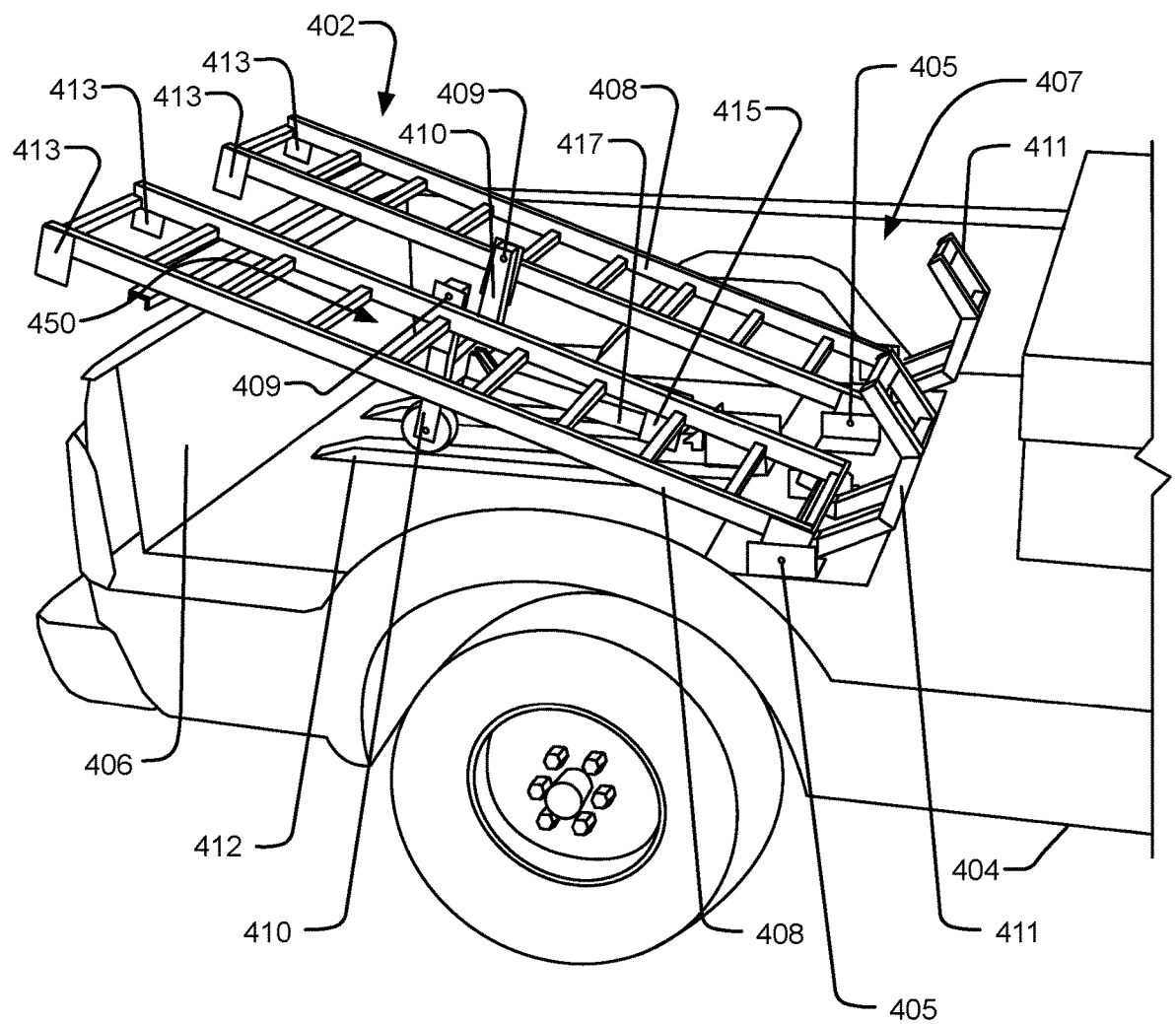
FIG. 4 illustrates an example assistance vehicle tilt lift in a cut-away bed of a pickup truck.

FIG. 4 illustrates an example assistance vehicle tilt lift 402 in a cut-away bed 407 of a pickup truck 404. The assistance vehicle tilt lift 402 is in a raised position. As illustrated, a pivoting rack 408 of the assistance vehicle tilt lift 402 is longer than the bed 407 when the tailgate 406 of the pickup truck 404 is closed. Accordingly, the assistance vehicle tilt lift 402 tilts the pivoting rack 408, such that the back end of the pivoting rack 408 is supported above the tailgate 406 while the front end of the pivoting rack 408 is tilted down toward a pivot point 405 near the front of the bed 407.

The assistance vehicle tilt lift 402 is shown in FIG. 4 as including the pivoting rack 408, two roller support members 410, and two tapered rails 412, which will be described in more detail with reference to other figures. The roller support members 410 are rotatably connected to the pivoting rack 408 at a rotation point 409. An electric actuator 415 includes a rigid link 417 that retracts and extends between the pivot point 405 and the roller support members 410.

The rigid link 417 is connected to the roller support members 410 or to a structure connected to the roller support members 410, such that retraction and extension of the rigid link 417 move the roller support members 410. In one implementation, when the rigid link 417 retracts, it pulls the roller support members 410 to move toward the front of the bed 407 and rotate relative to the pivoting rack 408, causing the pivoting rack 408 to pivot relative to the pivot point 405 in the bed 407 and lifting the rear of the pivoting rack 408 above the rear of the bed 407. When the rigid link 417 extends, it pushes the roller support members 410 to move toward the rear of the bed 407 and rotate relative to the pivoting rack 408, causing the pivoting rack 408 to pivot relative to the pivot point 405 in the bed 407 and lowering the rear of the pivoting rack 408 toward the rear of the bed 407. In another implementation, direction of the roller support members 410 may be reversed, such that extending the rigid link 417 moves the roller support members 410 toward the rear of the bed 407 and raises the pivoting rack 408 and retracting the rigid link 417 moves the roller support members 410 toward the front of the bed 407 and lowers the pivoting rack 408.

The tapered rails 412 provide a tapered section having a slope to facilitate the rotation of the roller support members 410 during extension and retraction of the rigid link. The tapered rails 412 may also include tracks to further constrain lateral movement of the roller support member 410 within the bed 407.

Each pivoting rack 408 includes a track (e.g., track 450) to receive and guide wheels of the assistance vehicle 400. When loading the assistance vehicle 400 onto the assistance vehicle tilt lift 402, the assistance vehicle 400 loads up ramps (not shown) from the rear of the pivoting racks 408 and rolls forward to the front of the bed 407. When unloading the assistance vehicle 400 from the assistance vehicle tilt lift 402, the assistance vehicle 400 rolls toward the rear of the bed 407 and down ramps at the rear of the bed 407. The illustrated track 450 is shown as a sequence of lateral rails in the pivoting rack 408, although other track configurations are contemplated including without limitation a solid surface or rails running along a length of the pivoting rack 408.

Tailgate props 413 support the pivoting rack 408 of the assistance vehicle tilt lift 402 in a flat position above the tailgate 406 when the pivoting rack 408 is in a lowered position. Wheel restraints 411 are positioned near the front of the assistance vehicle tilt lift 402 to prevent the assistance vehicle 400 from rolling down the tilted pivoting rack 408 and into the back of the truck cab (or in the illustrated implementation, into the back of a storage container in the bed 407). The wheel restraint 411 may be integrated with the pivoting rack 408 or configured as a separate structure that is anchored to the assistance vehicle tilt lift 402, the bed 407, or some other structure on the pickup truck 404.

Figure 5:
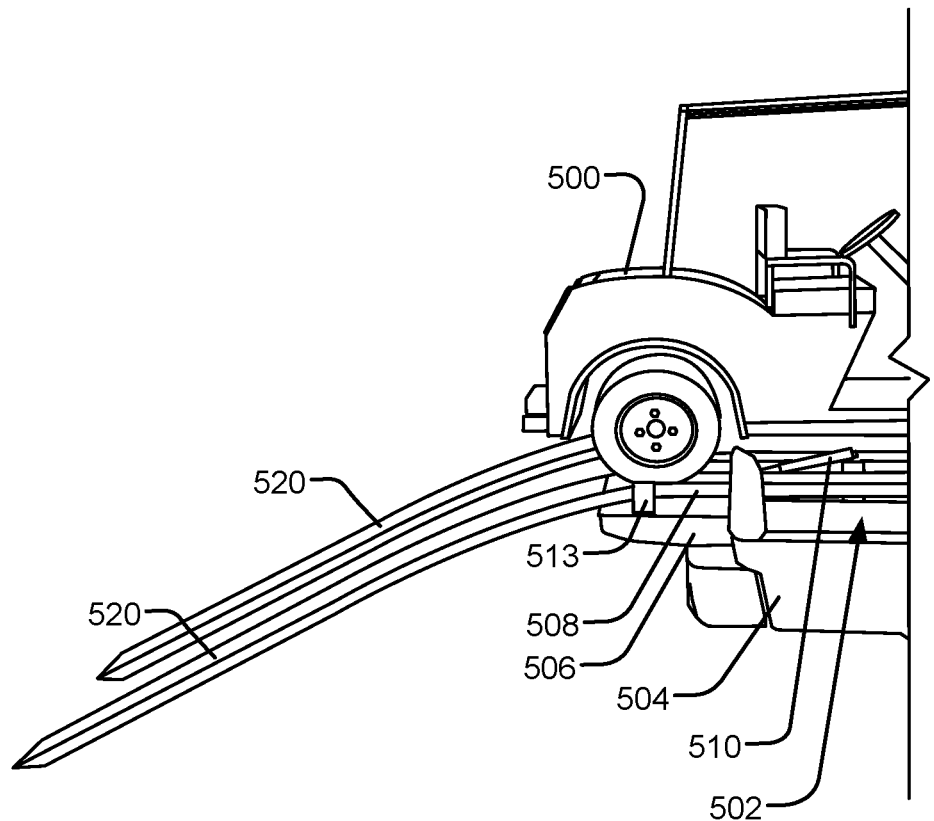
FIG. 5 illustrates a side view of ramps connected to an example assistance vehicle tilt lift in a cut-away bed of a pickup truck.

FIG. 5 illustrates a side view of ramps 520 connected to an example assistance vehicle tilt lift 502 in a cut-away bed of a pickup truck 504. The assistance vehicle tilt lift 502 is in a lowered position. When loading the assistance vehicle 500, the ramps 520 allow the assistance vehicle 500 to be driven from the ground up to the pivoting rack 508 of the assistance vehicle tilt lift 502. The ground ends of the ramps 520 are in contact with the ground, and the top ends of the ramps 520 are positioned on or near the pivoting rack 508 to allow the assistance vehicle 500 to roll onto the tracks of each pivoting rack 508 and toward the front of the bed of the pickup truck 504. A tailgate prop 513 supports the pivoting rack 508 of the assistance vehicle tilt lift 502 in a flat position above the tailgate 506. After the assistance vehicle 500 rolls forward the front edge of the pivoting racks 508, the ramps 520 can be removed and the end of the assistance vehicle tilt lift 502 at the rear of the bed can be lifted/tilted by an electric actuator (not shown) to allow the tailgate 506 to close under the higher end of the tilted pivoting racks 508.

When unloading the assistance vehicle 500, the tailgate 506 is opened, and the electric actuator of the assistance vehicle tilt lift 502 lowers the rear end of the assistance vehicle tilt lift 502 at the rear of the bed. The ramps 520 are re-installed so that the assistance vehicle 500 can be rolled off the pivoting racks 508 toward the rear end of the bed and down the ramps 520 to the ground.

Figure 6:
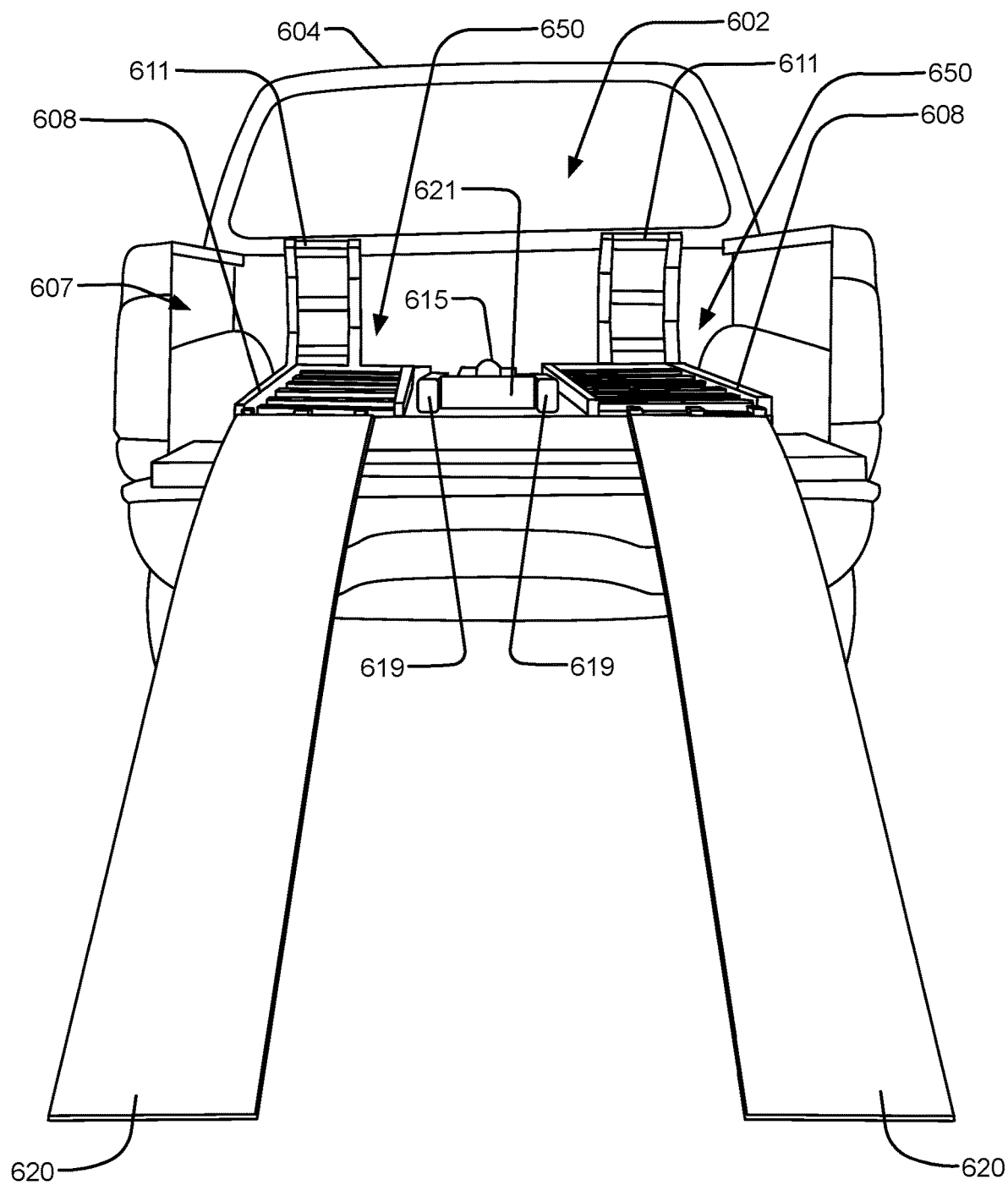
FIG. 6 illustrates a back view of ramps connected to an example assistance vehicle tilt lift in a bed of a pickup truck.

FIG. 6 illustrates a back view of ramps 620 connected to an example assistance vehicle tilt lift 602 in a bed 607 of a pickup truck 604. The assistance vehicle tilt lift 602 is shown in FIG. 6 in a lowered position and includes the pivoting rack 608, two roller support members connected to rollers 619, and two tapered rails (not shown). The roller support members are rotatably connected to the pivoting rack 608. An electric actuator 615 includes a rigid link (not shown) that retracts from and extends to the roller support members.

The rigid link is connected to the roller support members or to a structure (e.g., a crossbar 621) connected to the roller support members, such that retraction and extension of the rigid link move the roller support members. In one implementation, when the rigid link retracts, it pulls the roller support members to move toward the front of the bed 607 and rotate relative to the pivoting rack 608, causing the pivoting rack 608 to pivot relative to the pivot point at the front of the bed 607 and lifting the rear of the pivoting rack 608 above the rear of the bed 607. When the rigid link extends, it pushes the roller support members to move toward the rear of the bed 607 and rotate relative to the pivoting rack 608, causing the pivoting rack 608 to pivot relative to the pivot point at the front of the bed 607 and lowering the rear of the pivoting rack 608 toward the rear of the bed 607. In another implementation, direction of the roller support members may be reversed, such that extending the rigid link moves the roller support members toward the rear of the bed 607 and raises the rear of the pivoting rack 608 and retracting the rigid link moves the roller support members toward the front of the bed 607 and lowers the rear of the pivoting rack 608.

Each pivoting rack 608 includes a track (e.g., tracks 550) to receive and guide wheels of the assistance vehicle 600. When loading the assistance vehicle 600 onto the assistance vehicle tilt lift 602, the assistance vehicle 600 loads up ramps 620 from the rear of the pivoting racks 608 and rolls forward to the front of the bed 607. When unloading the assistance vehicle 600 from the assistance vehicle tilt lift 602, the assistance vehicle 600 rolls toward the rear of the bed 607 and down ramps at the rear of the bed 607. The illustrated track 650 is shown as a sequence of lateral rails in the pivoting rack 608, although other track configurations are contemplated including without limitation a solid surface or rails running along a length of the pivoting rack 608.

Wheel restraints 611 are positioned near the front of the assistance vehicle tilt lift 602 to prevent the assistance vehicle 600 from rolling down the tilted pivoting rack 608 and into the back of the truck cab (or into a back of a storage container in the bed 607). The wheel restraint 611 may be integrated with the pivoting rack 608 or configured as a separate structure that is anchored to the assistance vehicle tilt lift 602, the bed 607, or some other structure on the pickup truck 604.

Figure 7:
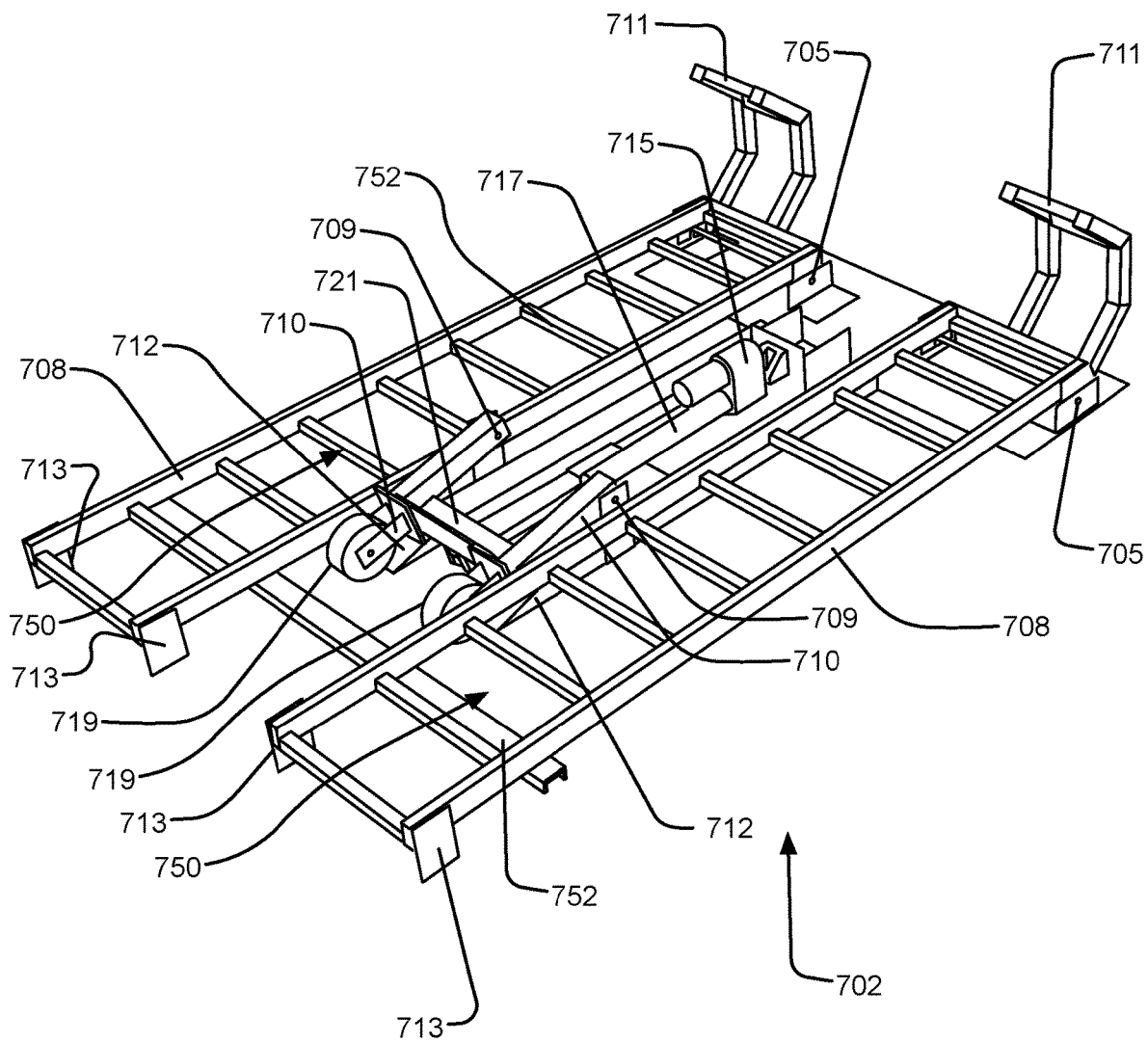
FIG. 7 illustrates a top perspective view of an example assistance vehicle tilt lift.

FIG. 7 illustrates a top perspective view of an example assistance vehicle tilt lift 702. The assistance vehicle tilt lift 702 is in a lowered position, albeit absent a hauling vehicle. The assistance vehicle tilt lift 702 is shown in FIG. 7 as including the pivoting rack 708, two roller support members 710 connected to rollers 719, and two tapered rails 712. The tapered rails 712 are configured to attached to the surface of the bed of the hauling vehicle (not shown). The roller support members 710 are rotatably connected to the pivoting rack 708 at rotation points 709. An electric actuator 715 includes a rigid link 717 that retracts and extends to the roller support members 710.

The rigid link 717 is connected to the roller support members 710 or to a structure (e.g., a crossbar 721) connected to the roller support members 710, such that retraction and extension of the rigid link 717 move the roller support members 710. In one implementation, when the rigid link 717 retracts, it pulls the roller support members 710 to move toward the front of the bed and rotate relative to the pivoting rack 708, causing the pivoting rack 708 to pivot relative to the pivot point 705 at the front of the bed and lifting the rear of the pivoting rack 708 above the rear of the bed. When the rigid link 717 extends, it pushes the roller support members 710 to move toward the rear of the bed and rotate relative to the pivoting rack 708, causing the pivoting rack 708 to pivot relative to the pivot point 705 at the front of the bed and lowering the rear of the pivoting rack 708 toward the rear of the bed. In another implementation, direction of the roller support members 710 may be reversed, such that extending the rigid link 717 moves the roller support members 710 toward the rear of the bed and raises the rear of the pivoting rack 708 and retracting the rigid link 717 moves the roller support members 710 toward the front of the bed and lowers the rear of the pivoting rack 708.

Each pivoting rack 708 includes a track (e.g., tracks 750) to receive and guide wheels of the assistance vehicle. When loading the assistance vehicle onto the assistance vehicle tilt lift 702, the assistance vehicle loads up ramps from the rear of the pivoting racks 708 and rolls forward to the front of the bed. When unloading the assistance vehicle from the assistance vehicle tilt lift 702, the assistance vehicle rolls toward the rear of the bed and down ramps at the rear of the bed. The illustrated track 750 is shown as a sequence of lateral rails (e.g., lateral rail 752) in the pivoting rack 708, although other track configurations are contemplated including without limitation a solid surface or rails running along a length of the pivoting rack 708.

Tailgate props 713 support the pivoting rack 708 of the assistance vehicle tilt lift 702 in a flat position above the tailgate when the pivoting rack 708 is in a lowered position. Wheel restraints 711 are positioned near the front of the assistance vehicle tilt lift 702 to prevent the golf cart from rolling down the tilted pivoting rack 708 and into the back of the truck cab (or into a back of a storage container in the bed). The wheel restraint 711 may be integrated with the pivoting rack 708 or configured as a separate structure that is anchored to the assistance vehicle tilt lift 702, the bed, or some other structure on the hauling vehicle.

Figure 8:
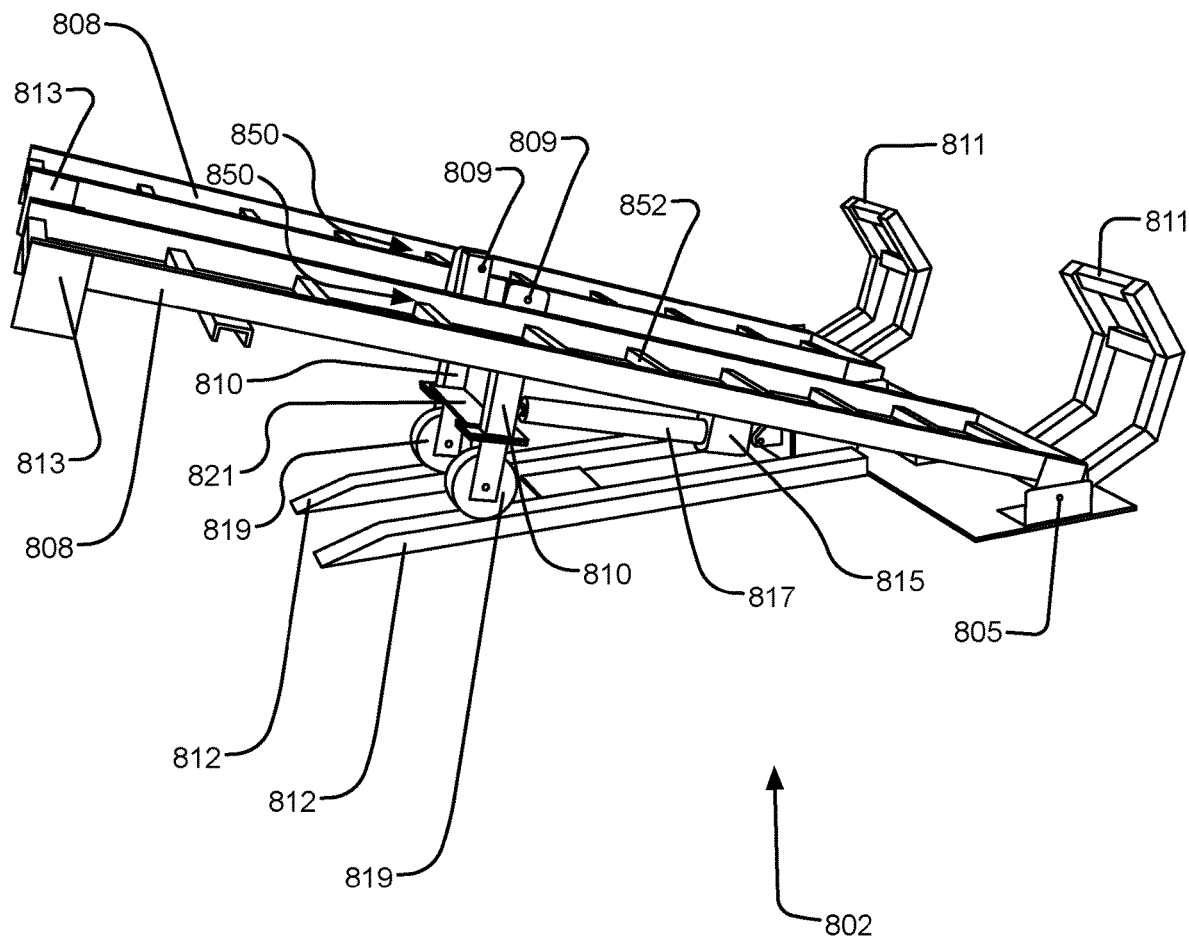
FIG. 8 illustrates a side perspective view of an example assistance vehicle tilt lift.

FIG. 8 illustrates a side perspective view of an example assistance vehicle tilt lift 802. The assistance vehicle tilt lift 802 is in a raised position, albeit absent a hauling vehicle. The assistance vehicle tilt lift 802 is shown in FIG. 8 as including the pivoting rack 808, two roller support members 810 connected to rollers 819, and two tapered rails 812. The tapered rails 812 are configured to attach to the surface of the bed of the hauling vehicle (not shown). The roller support members 810 are rotatably connected to the pivoting rack 808 at rotation points 809. An electric actuator 815 includes a rigid link 817 that retracts and extends to the roller support members 810.

The rigid link 817 is connected to the roller support members 810 or to a structure (e.g., a crossbar 821) connected to the roller support members 810, such that retraction and extension of the rigid link 817 move the roller support members 810. In one implementation, when the rigid link 817 retracts, it pulls the roller support members 810 to move toward the front of the bed and rotate relative to the pivoting rack 808, causing the pivoting rack 808 to pivot relative to the pivot point 805 at the front of the bed and lifting the rear of the pivoting rack 808 above the rear of the bed. When the rigid link 817 extends, it pushes the roller support members 810 to move toward the rear of the bed and rotate relative to the pivoting rack 808, causing the pivoting rack 808 to pivot relative to the pivot point 805 at the front of the bed and lowering the rear of the pivoting rack 808 toward the rear of the bed. In another implementation, direction of the roller support members 810 may be reversed, such that extending the rigid link 817 moves the roller support members 810 toward the rear of the bed and raises the rear of the pivoting rack 808 and retracting the rigid link 817 moves the roller support members 810 toward the front of the bed and lowers the rear of the pivoting rack 808.

Each pivoting rack 808 includes a track (e.g., tracks 850) to receive and guide wheels of the assistance vehicle. When loading the assistance vehicle onto the assistance vehicle tilt lift 802, the assistance vehicle loads up ramps from the rear of the pivoting racks 808 and rolls forward to the front of the bed. When unloading the assistance vehicle from the assistance vehicle tilt lift 802, the assistance vehicle rolls toward the rear of the bed and down ramps at the rear of the bed. The illustrated tracks 850 are shown as a sequence of lateral rails (e.g., lateral rail 852) in the pivoting rack 808, although other track configurations are contemplated including without limitation a solid surface or rails running along a length of the pivoting rack 808.

Tailgate props 813 support the pivoting rack 808 of the assistance vehicle tilt lift 802 in a flat position above the tailgate when the pivoting rack 808 is in a lowered position. Wheel restraints 811 are positioned near the front of the assistance vehicle tilt lift 802 to prevent the golf cart from rolling down the tilted pivoting rack 808 and into the back of the truck cab (or into a back of a storage container in the bed). The wheel restraint 811 may be integrated with the pivoting rack 808 or configured as a separate structure that is anchored to the assistance vehicle tilt lift 802, the bed, or some other structure on the hauling vehicle.

Figure 9:
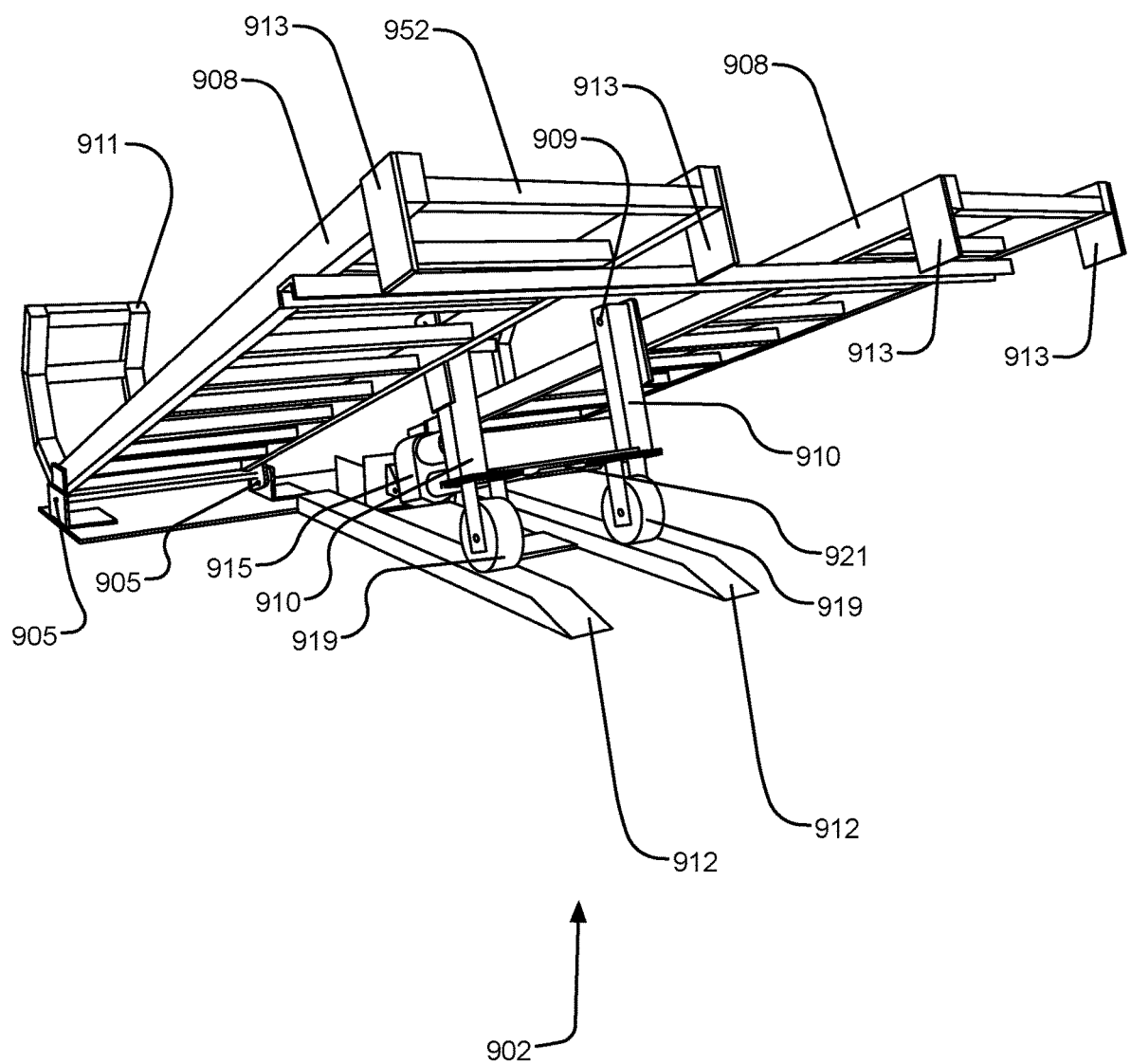
FIG. 9 illustrates a front perspective view of an example assistance vehicle tilt lift.

FIG. 9 illustrates a front perspective view of an example assistance vehicle tilt lift 902. The assistance vehicle tilt lift 902 is in a raised position, albeit absent a hauling vehicle. The assistance vehicle tilt lift 902 is shown in FIG. 9 as including the pivoting rack 908, two roller support members 910 connected to rollers 919, and two tapered rails 912. The tapered rails 912 are configured to attach to the surface of the bed of the hauling vehicle (not shown). The roller support members 910 are rotatably connected to the pivoting rack 908 at rotation points 909. An electric actuator 915 includes a rigid link that retracts and extends to the roller support members 910.

The rigid link is connected to the roller support members 910 or to a structure (e.g., a crossbar 921) connected to the roller support members 910, such that retraction and extension of the rigid link move the roller support members 910. In one implementation, when the rigid link retracts, it pulls the roller support members 910 to move toward the front of the bed and rotate relative to the pivoting rack 908, causing the pivoting rack 908 to pivot relative to the pivot point 905 at the front of the bed and lifting the rear of the pivoting rack 908 above the rear of the bed. When the rigid link extends, it pushes the roller support members 910 to move toward the rear of the bed and rotate relative to the pivoting rack 908, causing the pivoting rack 908 to pivot relative to the pivot point 905 at the front of the bed and lowering the rear of the pivoting rack 908 toward the rear of the bed. In another implementation, direction of the roller support members 910 may be reversed, such that extending the rigid link moves the roller support members 910 toward the rear of the bed and raises the rear of the pivoting rack 908 and retracting the rigid link moves the roller support members 910 toward the front of the bed and lowers the rear of the pivoting rack 908.

Each pivoting rack 908 includes a track (e.g., tracks 950) to receive and guide wheels of the assistance vehicle. When loading the assistance vehicle onto the assistance vehicle tilt lift 902, the assistance vehicle loads up ramps from the rear of the pivoting racks 908 and rolls forward to the front of the bed. When unloading the assistance vehicle from the assistance vehicle tilt lift 902, the assistance vehicle rolls toward the rear of the bed and down ramps at the rear of the bed. The illustrated tracks 950 are shown as a sequence of lateral rails (e.g., lateral rail 952) in the pivoting rack 908, although other track configurations are contemplated including without limitation a solid surface or rails running along a length of the pivoting rack 908.

Tailgate props 913 support the pivoting rack 808 of the assistance vehicle tilt lift 802 in a flat position above the tailgate when the pivoting rack 908 is in a lowered position. A wheel restraint 911 is positioned near the front of the assistance vehicle tilt lift 902 to prevent the golf cart from rolling down the tilted pivoting rack 908 and into the back of the truck cab (or into a back of a storage container in the bed). The wheel restraint 911 may be integrated with the pivoting rack 908 or configured as a separate structure that is anchored to the assistance vehicle tilt lift 902, the bed, or some other structure on the hauling vehicle.

Figure 10:
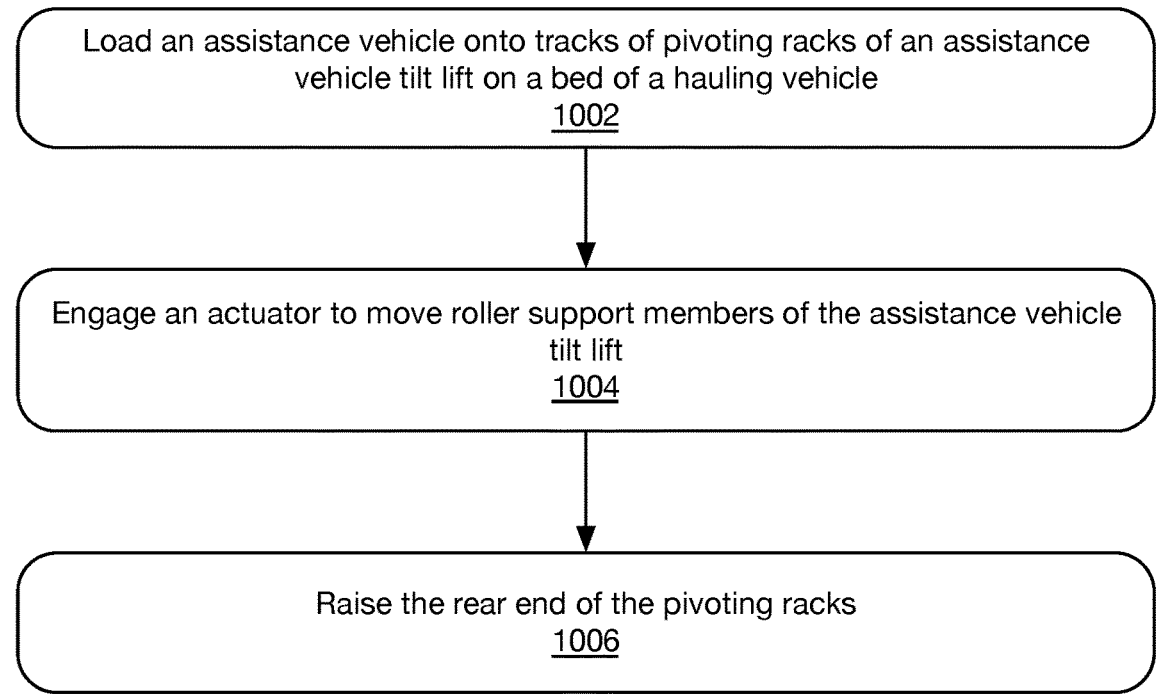
FIG. 10 illustrates operations for loading a vehicle on an example assistance vehicle tilt lift.

FIG. 10 illustrates operations 1000 for loading a vehicle on an example assistance vehicle tilt lift. Various implementations of example assistance vehicle tilt lifts described herein may be employed to perform the illustrated operations. The assistance vehicle tilt lift is installed on a bed of a hauling vehicle, such as a pickup truck. Installation structures such as bolts may be used to anchor the assistance vehicle tilt lift to the bed, although other installation structures may be employed, including brackets, rivets, screws, welded joints, and adhesives. A loading operation 1002 receives an assistance vehicle onto tracks of pivoting racks of an assistance vehicle tilt lift installed on a bed of a hauling vehicle. In one implementation, one or more ramps may be employed to move the assistance vehicle from the ground to the bed of the hauling vehicle, although other components may be employed including cranes, pulleys, and winches. A moving operation 1004 engages an actuator to move roller support members of the assistance vehicle tilt lift. In one implementation, the roller support members move along rails (e.g., tapered rails) in the bed. Responsive to the movement of the roller support members, a raising operation 1006 raises the rear end of the pivoting track (and therefore an end of the loaded assistance vehicle) above the bed of the hauling vehicle.

FIG. 11 illustrates operations 1100 for unloading a vehicle from an example assistance vehicle tilt lift. Various implementations of example assistance vehicle tilt lifts described herein may be employed to perform the illustrated operations. A moving operation 1102 engages an actuator to move roller support members of the assistance vehicle tilt lift. In one implementation, the roller support members move along rails (e.g., tapered rails) in the bed. Responsive to the movement of the roller support members, a lowering operation 1104 lowers the rear end of the pivoting track (and therefore an end of the loaded assistance vehicle) toward the bed of the hauling vehicle. An unloading operation 1106 allows an assistance vehicle to roll off the tracks of pivoting racks of the assistance vehicle tilt lift installed on the bed of the hauling vehicle. In one implementation, one or more ramps may be employed to move the assistance vehicle from the bed of the hauling vehicle to the ground, although other components may be employed including cranes, pulleys, and winches.

An example assistance vehicle tilt lift is configured to support an assistance vehicle above a bed of a hauling vehicle. The bed includes a front end and a rear end. The assistance vehicle includes one or more wheels. The assistance vehicle tilt lift includes one or more pivoting racks. Each pivoting rack includes a track configured to receive at least one of the one or more wheels of the assistance vehicle and further including a front end positionable near the front end of the bed and a rear end positionable near the rear end of the bed. Each pivoting rack is rotatably attached to a pivot point near the front end of the bed of the hauling vehicle. The assistance vehicle tilt lift further includes one or more tapered rails configured to be attached to the bed of the hauling vehicle and one or more roller support members configured to be in contact with the one or more tapered rails and rotatably attached to the one or more pivoting racks at a rotation point on the one or more pivoting racks. The assistance vehicle tilt lift still further includes an actuator operably connected to the one or more roller support members. The actuator is configured to raise and lower the rear end of the one or more pivoting racks relative to the pivot point by moving the one or more roller support members along the one or more tapered rails.

Another example assistance vehicle tilt lift of any preceding assistance vehicle tilt lift is provided, wherein each tapered rail includes a tapered section, each roller support member includes a roller, each roller being configured to roll an end of the roller support member along the tapered section of a corresponding tapered rail of the one or more tapered rails while an opposite end of the roller support member rotates about the rotation point.

Another example assistance vehicle tilt lift of any preceding assistance vehicle tilt lift further includes a rigid link operably connecting the actuator to the one or more roller support members.

Another example assistance vehicle tilt lift of any preceding assistance vehicle tilt lift is provided, wherein the actuator is configured to raise the rear end of a pivoting rack by retracting the rigid link between the actuator and the one or more roller support members.

Another example assistance vehicle tilt lift of any preceding assistance vehicle tilt lift is provided, wherein the actuator is configured to lower the rear end of a pivoting rack by extending the rigid link between the actuator and the one or more roller support members.

Another example assistance vehicle tilt lift of any preceding assistance vehicle tilt lift is provided, wherein the actuator is configured to raise the rear end of a pivoting rack by extending the rigid link between the actuator and the one or more roller support members.

Another example assistance vehicle tilt lift of any preceding assistance vehicle tilt lift is provided, wherein the actuator is configured to lower the rear end of a pivoting rack by retracting the rigid link between the actuator and the one or more roller support members.

Another example assistance vehicle tilt lift of any preceding assistance vehicle tilt lift further includes a prop at the rear end of each of the one or more pivoting racks, each prop supporting the rear end of the pivoting rack above the bed of the hauling vehicle with the pivoting rack is in a lowered position.

Another example assistance vehicle tilt lift of any preceding assistance vehicle tilt lift is provided, wherein the prop is configured to support the rear end of the pivoting rack on an open tailgate of the hauling vehicle with the pivoting rack is in a lowered position.

Another example assistance vehicle tilt lift of any preceding assistance vehicle tilt lift is provided, wherein the pivot point is configured to be operably attached to the front end of the bed of the hauling vehicle.

Another example assistance vehicle tilt lift of any preceding assistance vehicle tilt lift is provided, wherein the one or more tapered rails are configured to be operably attached to the bed of the hauling vehicle.

Another example assistance vehicle tilt lift of any preceding assistance vehicle tilt lift further includes a wheel restraint positioned near the front end of the bed of the hauling vehicle.

An example method of supporting an assistance vehicle above a bed of a hauling vehicle, the bed having a front end and a rear end, the assistance vehicle including one or more wheels. The method includes installing an assistance vehicle tilt lift in the bed of the hauling vehicle, the assistance vehicle tilt lift including one or more pivoting racks, each pivoting rack including a track configured to receive at least one of the one or more wheels of the assistance vehicle and further including a front end positionable near the front end of the bed and a rear end positionable near the rear of the bed. Each pivoting rack is rotatably attached to a pivot point near the front end of the bed of the hauling vehicle. One or more tapered rails are configured to be attached to the bed of the hauling vehicle. One or more roller support members are configured to be in contact with the one or more tapered rails and rotatably attached to the one or more pivoting racks at a rotation point on the one or more pivoting racks. The method further includes raising and lowering the rear end of the one or more pivoting racks relative to the pivot point by moving the one or more roller support members along the one or more tapered rails.

Another example method of any preceding method is provided, wherein each tapered rail includes a tapered section, each roller support member includes a roller, each roller being configured to roll an end of the roller support member along the tapered section of a corresponding tapered rail of the one or more tapered rails while an opposite end of the roller support member rotates about the rotation point.

Another example method of any preceding method is provided, wherein an actuator moves the one or more roller support members along the one or more tapered rails.

Another example method of any preceding method is provided, wherein a rigid member operably connects the actuator to the one or more roller support members, and the actuator raises the rear end of a pivoting rack by retracting the rigid link between the actuator and the one or more roller support members.

Another example method of any preceding method is provided, wherein a rigid member operably connects the actuator to the one or more roller support members, and the actuator lowers the rear end of a pivoting rack by extending the rigid link between the actuator and the one or more roller support members.

Another example method of any preceding method is provided, wherein a rigid member operably connects the actuator to the one or more roller support members, and the actuator raises the rear end of a pivoting rack by extending the rigid link between the actuator and the one or more roller support members.

Another example method of any preceding method is provided, wherein a rigid member operably connects the actuator to the one or more roller support members, and the actuator lowers the rear end of a pivoting rack by retracting the rigid link between the actuator and the one or more roller support members.

An example assistance system for an assistance vehicle including one or more wheels includes a hauling vehicle having a bed and an assistance vehicle tilt lift configured to support the assistance vehicle above the bed of the hauling vehicle. The bed includes a front end and a rear end. The assistance vehicle tilt lift includes one or more pivoting racks. Each pivoting rack includes a track configured to receive at least one of the one or more wheels of the assistance vehicle and further includes a front end positionable near the front end of the bed and a rear end positionable near the rear of the bed. Each pivoting rack is rotatably attached to a pivot point near the front end of the bed of the hauling vehicle. One or more tapered rails are configured to be attached to the bed of the hauling vehicle. One or more roller support members are configured to be in contact with the one or more tapered rails and rotatably attached to the one or more pivoting racks at a rotation point on the one or more pivoting racks. The assistance vehicle tilt lift also includes an actuator operably connected to the one or more roller support members. The actuator is configured to raise and lower the rear end of the one or more pivoting racks relative to the pivot point by moving the one or more roller support members along the one or more tapered rails.

An example system for supporting an assistance vehicle above a bed of a hauling vehicle, the bed having a front end and a rear end, the assistance vehicle including one or more wheels. The system includes means for installing an assistance vehicle tilt lift in the bed of the hauling vehicle, the assistance vehicle tilt lift including one or more pivoting racks, each pivoting rack including a track configured to receive at least one of the one or more wheels of the assistance vehicle and further including a front end positionable near the front end of the bed and a rear end positionable near the rear of the bed. Each pivoting rack is rotatably attached to a pivot point near the front end of the bed of the hauling vehicle. One or more tapered rails are configured to be attached to the bed of the hauling vehicle. One or more roller support members are configured to be in contact with the one or more tapered rails and rotatably attached to the one or more pivoting racks at a rotation point on the one or more pivoting racks. The method further includes means for raising and lowing the rear end of the one or more pivoting racks relative to the pivot point by moving the one or more roller support members along the one or more tapered rails.

Another example system of any preceding system is provided, wherein each tapered rail includes a tapered section, each roller support member includes a roller, each roller being configured to roll an end of the roller support member along the tapered section of a corresponding tapered rail of the one or more tapered rails while an opposite end of the roller support member rotates about the rotation point.

Another example system of any preceding system is provided, wherein an actuator moves the one or more roller support members along the one or more tapered rails.

Another example system of any preceding system is provided, wherein a rigid member operably connects the actuator to the one or more roller support members, and the actuator raises the rear end of a pivoting rack by retracting the rigid link between the actuator and the one or more roller support members.

Another example system of any preceding system is provided, wherein a rigid member operably connects the actuator to the one or more roller support members, and the actuator lowers the rear end of a pivoting rack by extending the rigid link between the actuator and the one or more roller support members.

Another example system of any preceding system is provided, wherein a rigid member operably connects the actuator to the one or more roller support members, and the actuator raises the rear end of a pivoting rack by extending the rigid link between the actuator and the one or more roller support members.

Another example system of any preceding system is provided, wherein a rigid member operably connects the actuator to the one or more roller support members, and the actuator lowers the rear end of a pivoting rack by retracting the rigid link between the actuator and the one or more roller support members.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A vehicle tilt lift configured to support a vehicle above a bed of a hauling vehicle, the bed having a front end and a rear end, the vehicle including one or more wheels, the vehicle tilt lift comprising:
one or more pivoting racks, each pivoting rack including a track configured to receive at least one of the one or more wheels of the vehicle and further including a front end positionable near the front end of the bed and a rear end positionable near the rear end of the bed;
one or more tapered rails configured to be attached to the bed of the hauling vehicle; and
one or more roller support members configured to be in contact with the one or more tapered rails and rotatably attached to the one or more pivoting racks at a rotation point on the one or more pivoting racks, wherein the rear end of at least one of the one or more pivoting racks raises and lowers by moving the one or more roller support members along the one or more tapered rails.

2. The vehicle tilt lift of claim 1, wherein each tapered rail includes a tapered section, each roller support member includes a roller, each roller being configured to roll an end of the roller support member along the tapered section of a corresponding tapered rail of the one or more tapered rails while an opposite end of the roller support member rotates about the rotation point.

3. The vehicle tilt lift of claim 1, further comprising:
an actuator operably connected to the one or more roller support members, the actuator being configured to raise and lower the rear end of the one or more pivoting racks by moving the one or more roller support members along the one or more tapered rails.

4. The vehicle tilt lift of claim 3, further comprising:
a rigid link operably connecting the actuator to the one or more roller support members.

5. The vehicle tilt lift of claim 4, wherein the actuator is configured to raise the rear end of a pivoting rack of the one or more pivoting racks by retracting the rigid link between the actuator and the one or more roller support members.

6. The vehicle tilt lift of claim 4, wherein the actuator is configured to lower the rear end of a pivoting rack of the one or more pivoting racks by extending the rigid link between the actuator and the one or more roller support members.

7. The vehicle tilt lift of claim 4, wherein the actuator is configured to raise the rear end of a pivoting rack of the one or more pivoting racks by extending the rigid link between the actuator and the one or more roller support members.

8. The vehicle tilt lift of claim 4, wherein the actuator is configured to lower the rear end of a pivoting rack of the one or more pivoting racks by retracting the rigid link between the actuator and the one or more roller support members.

9. The vehicle tilt lift of claim 1, further comprising:
a prop at the rear end of each of the one or more pivoting racks, each prop is configured to support the rear end of the pivoting rack above the bed of the hauling vehicle when the pivoting rack is in a lowered position.

10. The vehicle tilt lift of claim 9, wherein the prop is configured to support the rear end of the pivoting rack on an open tailgate of the hauling vehicle when the pivoting rack is in a lowered position.

11. The vehicle tilt lift of claim 1, wherein the one or more tapered rails are configured to be operably attached the bed of the hauling vehicle.

12. The vehicle tilt lift of claim 1, further comprising:
a wheel restraint positioned near the front end of the bed of the hauling vehicle.

13. A method of supporting a vehicle above a bed of a hauling vehicle, the bed having a front end and a rear end, the vehicle including one or more wheels, the method comprising:
installing a vehicle tilt lift in the bed of the hauling vehicle, the vehicle tilt lift including one or more pivoting racks, each pivoting rack including a track configured to receive at least one of the one or more wheels of the vehicle and further including a front end positionable near the front end of the bed and a rear end positionable near the rear end of the bed; one or more tapered rails configured to be attached to the bed of the hauling vehicle; and one or more roller support members configured to be in contact with the one or more tapered rails and rotatably attached to the one or more pivoting racks at a rotation point on the one or more pivoting racks, wherein the rear end of at least one of the one or more pivoting racks raises and lowers by moving the one or more roller support members along the one or more tapered rails.

14. The method of claim 13, wherein each tapered rail includes a tapered section, each roller support member includes a roller, each roller being configured to roll an end of the roller support member along the tapered section of a corresponding tapered rail of the one or more tapered rails while an opposite end of the roller support member rotates about the rotation point.

15. The method of claim 13, wherein the vehicle tilt lift includes an actuator configured to move the one or more roller support members along the one or more tapered rails.

16. The method of claim 15, wherein the vehicle tilt lift includes a rigid member configured to operably connect the actuator to the one or more roller support members, and the actuator is configured to raise the rear end of a pivoting rack of the one or more pivoting racks by retracting the rigid member between the actuator and the one or more roller support members.

17. The method of claim 15, wherein the vehicle tilt lift includes a rigid member configured to operably connect the actuator to the one or more roller support members, and the actuator is configured to lower the rear end of a pivoting rack of the one or more pivoting racks by extending the rigid member between the actuator and the one or more roller support members.

18. The method of claim 15, wherein the vehicle tilt lift is includes a rigid member configured to operably connect the actuator to the one or more roller support members, and the actuator raises the rear end of a pivoting rack of the one or more pivoting racks by extending the rigid member between the actuator and the one or more roller support members.

19. The method of claim 15, wherein the vehicle tilt lift is includes a rigid member configured to operably connect the actuator to the one or more roller support members, and the actuator lowers the rear end of a pivoting rack of the one or more pivoting racks by retracting the rigid member between the actuator and the one or more roller support members.

20. A system for a vehicle including one or more wheels, the system comprising:
a hauling vehicle having a bed; and
a vehicle tilt lift configured to support the vehicle above the bed of the hauling vehicle, the bed having a front end and a rear end, the vehicle tilt lift including:
one or more pivoting racks, each pivoting rack including a track configured to receive at least one of the one or more wheels of the vehicle and further including a front end positionable near the front end of the bed and a rear end positionable near the rear end of the bed,
one or more tapered rails configured to be attached to the bed of the hauling vehicle,
one or more roller support members configured to be in contact with the one or more tapered rails and rotatably attached to the one or more pivoting racks at a rotation point on the one or more pivoting racks, wherein the rear end of at least one of the one or more pivoting racks raises and lowers by moving the one or more roller support members along the one or more tapered rails.

* * * * *